L. McDANIEL.
MARKER LIFTER FOR PLANTERS.
APPLICATION FILED NOV. 27, 1908.
912,484.
Patented Feb. 16, 1909.
2 SHEETS—SHEET 2.
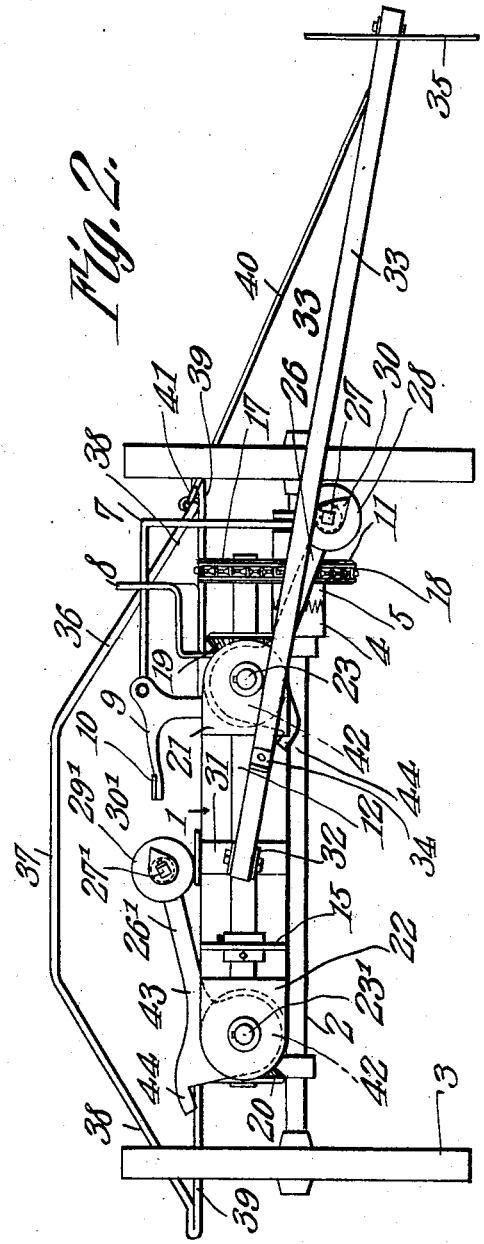
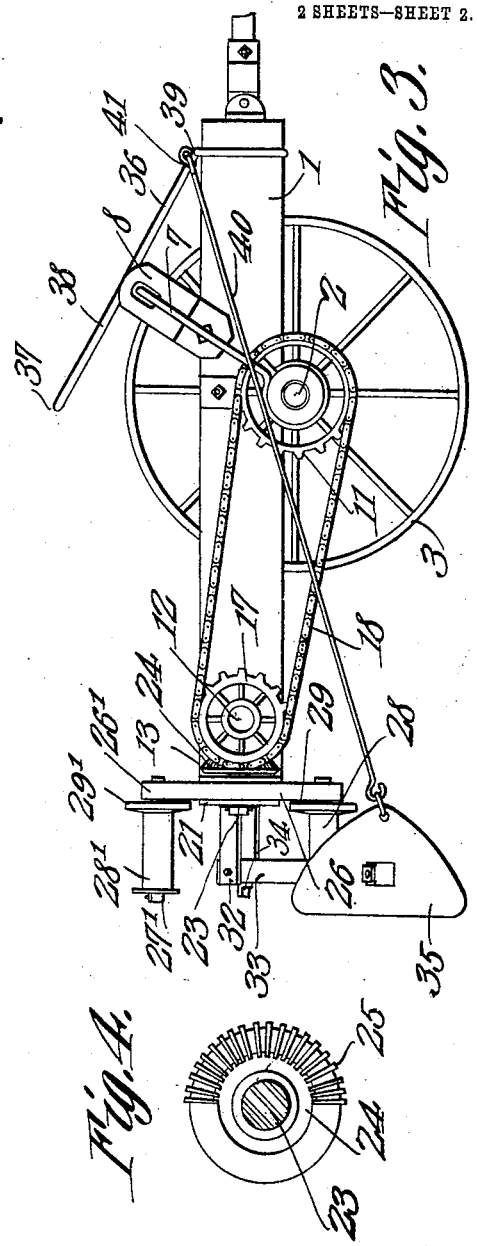
Inventor
Lewis McDaniel.
By C. A. Snow & Co.
Attorneys
Witnesses

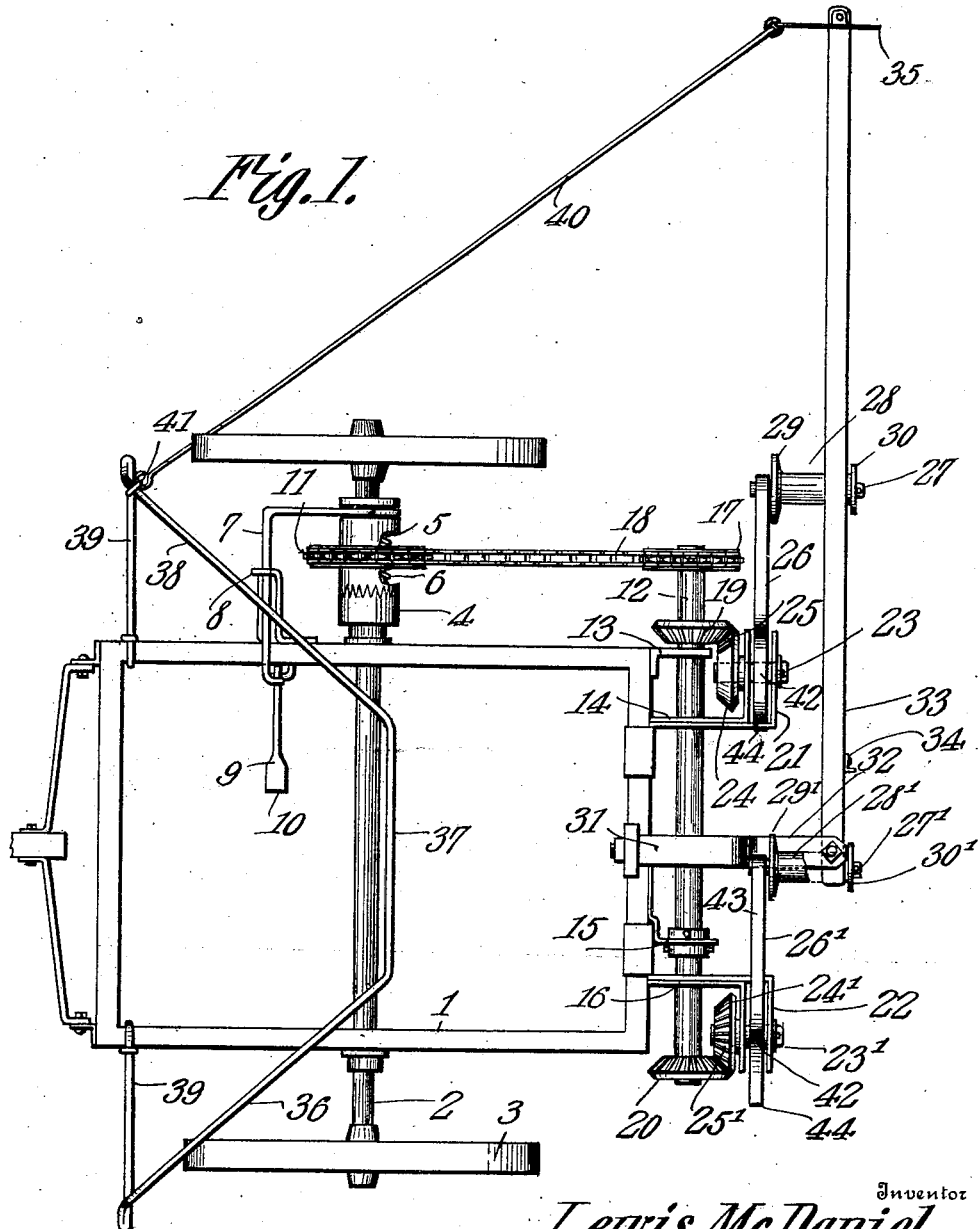

UNITED STATES PATENT OFFICE.

LEWIS McDANIEL, OF NEWARK, MISSOURI.

MARKER-LIFTER FOR PLANTERS.

No. 912,484.　　　　Specification of Letters Patent.　　　Patented Feb. 16, 1909.

Application filed November 27, 1908. Serial No. 464,628.

*To all whom it may concern:*

Be it known that I, LEWIS McDANIEL, a citizen of the United States, residing at Newark, in the county of Knox and State of Missouri, have invented a new and useful Marker-Lifter for Planters, of which the following is a specification.

This invention has relation to marker lifters. for planters and it consists in the novel construction and arrangement of its parts as hereinafter shown and described.

The object of the invention is to provide an automatic means for lifting the marker such as generally used upon corn planters, which means is susceptible of manual operation whereby the marker may be caused to descend to one or the other side of the frame of the implement upon which it is mounted.

The parts of the mechanism are so arranged that the marker may be held in an elevated position when desired, so that the implement may be transported from place to place without interference on the part of the said marker.

With these objects in view the invention consists of the novel construction hereinafter pointed out.

In the accompanying drawings:—Figure 1 is a plan view of a planter frame with the marker lifter attached thereto. Fig. 2 is a rear view of the same. Fig. 3 is a side elevation of the same. Fig. 4 is a detail view of a pinion used in the marker lifter mechanism.

As is usual, the planter frame 1 is mounted upon the axle 2, which, in turn, is supported upon the traction wheels 3. The said axle 2 rotates with the wheels 3 and the clutch member 4 is fixed to the axle. The clutch member 5 is slidably mounted upon the axle 2, and the coil spring 6 is interposed between the clutch members 4 and 5 and is under tension with a tendency to hold the member 5 away from the member 4. The arm 7 is slidably mounted in a guide 8 which is mounted upon the frame 1, and one end of the said arm 7 engages the clutch member 5, while the opposite end is pivotally connected with the lever 9, which, in turn, is fulcrumed upon the frame 1 and is provided with a foot-treadle 10. A sprocket wheel 11 is mounted upon the clutch member 5.

The shaft 12 is journaled for rotation in the bearings, 13, 14, 15 and 16, which are mounted at the rear end of the frame 1. The sprocket wheel 17 is mounted upon one end of the shaft 12, and the sprocket chain 18 passes around the sprocket wheels 11 and 17. The beveled pinions 19 and 20 are mounted upon the shaft 12 in the vicinity of the opposite ends thereof. The bearings 14 and 16 are extended rearwardly and laterally into the set of parallel arms 21 and 22 respectively. A stub shaft 23 is journaled for rotation in the arms 21, and is provided, at its inner end, with a beveled pinion 24, which is provided with a series of interrupted teeth 25, which, at times, mesh with the pinion 19.

An arm 26 is fixed to the shaft 23 and is located between the arms 21. The laterally disposed pin 27 is mounted at the outer end portion of the arm 26, and the spool 28 is journaled for rotation upon the said pin 27. Said spool is provided at its inner end with an annular flange 29. The pear-shaped plate 30 is attached to the rear end portion of the pin 27 and is adapted to hold the spool 28 in position upon the said pin. In a similar manner the stub shaft 23' is journaled in the arms 22, and is provided at its inner end with a beveled pinion 24' which, in turn, is provided with an interrupted gear 25'. The arm 26' is mounted upon the shaft 23' and is located between the arms 22, and is provided at its outer end with a laterally disposed pin 27'. The spool 28' is journaled for rotation upon the pin 27' and is provided at its inner end with a flange 29'. The pear-shaped plate 30' is attached to the rear or outer end of the pin 27' and is adapted to hold the spool 28' in position upon the said pin.

The bracket 31 projects rearwardly from the frame 1, and the yoke 32 is swiveled to the rear end of the said bracket 31. One end of the marker staff 33 is pivotally mounted between the arms of the yoke 32 and is provided upon its rear edge and in the vicinity of its pivoted end with a stop or lug 34. The marker 35 is attached to the outer or free end of the staff 33. The guide frame 36 is mounted upon the forward portion of the planter frame 1, and consists of the intermediate elevated portion 37, which merges at its end into the forwardly and downwardly and outwardly inclined portions 38, which, in turn, merge into the inwardly disposed substantially horizontal portions 39, which are connected, at their inner ends, with the frame 1. The tether 40 is connected at one end with the marker 35, and is provided at its opposite end with a ring 41, which surrounds the wire or material of which the frame 36 is composed.

As shown in the drawing, it will be seen that the arms 26 and 26' are of peculiar configuration, and as the said arms are substantially the counterparts of each other, but are disposed oppositely with relation to each other upon their respective shafts, a description of one arm will answer for both. Each arm consists of a hub portion 42, which is fixed to the shaft upon which the arm is mounted, and the arm portion proper 43, is disposed at a tangent to a circle struck from the center of the hub portion 42. The portions 42 and 43 merge into the counterbalanced portion 44, which is located upon the opposite side of the supporting shaft of the arm from that upon which the arm portion lies.

By reference to Fig. 1 of the drawings it will be observed that the beveled pinion 19 engages the beveled pinion 24 at one side thereof, and that the beveled pinion 20 engages the beveled pinion 24' at the opposite side.

The operation of the marker lifter is as follows:—Presuming that the parts are in the positions shown in Fig. 1 of the drawings, and that the marker 35 is in contact with the surface of the ground, and it is desired to lift the marker out of contact with the ground, the operator places his foot upon the treadle 10 of the lever 9 and depresses the same, whereby the arm 7 is moved longitudinally in the guide 8 and the clutch member 5 is brought into contact with the clutch member 4 against the tension of the intermediate spring 6. Thus the member 5 is fixed with relation to the axle 2, and, as the implement advances and the said member 5 rotates with the axle 2, rotary movement is transmitted to the shaft 12 through the sprocket wheels 11 and 17 and the sprocket chain 18. As the shaft 12 rotates the pinion 19 will engage the teeth 25 of the pinion 24, while the pinion 20 will pass beyond the teeth 25' of the pinion 24'. Thus the said pinion 24' will remain at a state of rest, while the pinion 25 will be turned, together with the shaft 23, whereby the roller 28 on the arm 27 will be swung up under the staff 33 of the marker, and the marker 35 will be elevated and the staff 33 brought to an erect position. The said staff will be held in this position by the spools 28 and 28' which are mounted upon the pins 27 and 27' attached to the ends of the arms 26 and 26'; it being understood that the arms 26 and 26' will, at such time as last above described be disposed toward each other and will form lateral supports for the said staff 33. When the arm 26 is disposed toward the arm 26' as above described, the gear teeth of the pinion 19 will pass beyond the series of gear teeth 25 upon the pinion 24, so that the said pinion 24 will remain at a state of rest, and the arm 26 will be supported in an inclined position toward the shaft 23 by the inner end of the outer arm 21. Thus, as the frame 1 and its supporting axle and wheels advance, the staff 33 will be held in an erect position, and, as soon as the operator removes his foot from the treadle 10 of the lever 9, the tension of the spring 6 comes into play and forces the clutch member 5 away from the clutch member 4, whereby the axle 2 may continue to rotate while the shaft 12 remains at a state of rest. Thus it will be seen that the staff 33 is brought from a laterally disposed position into an erect position, and the same operation takes place if the staff 33 is swung from an inclined position at the opposite side of the frame into an erect position. When it is desired to lower the staff 33 to one side of the implement frame 1, the operator grasps the said staff and pulls the same forward which brings the lug 34 from under the pointed portions of the plates 30 and 30' and the forward side of the staff comes in contact with one of the flanges 29 or 29'. The staff 33 is then pushed manually toward that side of the implement upon which it is desired to dispose the marker. Thus strain is exerted upon one of the arms 26 or 26' and, in response to the strain, that arm is swung slightly up upon its shaft, and the said arm swings laterally and the staff 33 follows the same, and, eventually the marker 35 comes in contact with the ground in proper position. While the marker proper 35, is in contact with the ground, the ring 41 is located at the point of merger between the portions 38 and 39 of the frame 36, and the tether 40 serves as a brace for the outer end portion of the said staff 33. When the staff 33 is in an erect position between the rollers or spools 28 and 28', the pointed portions of the pear-shaped plates 30 and 30' are disposed toward each other, and the lug or stop 34 is located under the said pointed portions, and thus the said staff 33 is supported in an erect position without danger of falling rearwardly from between the said spools 28 and 28'. During the time that the staff 33 is lowering from an erect position into a laterally disposed position, the peculiar configuration of the supporting arm 26 or 26' materially adds to the prompt lowering of the staff 33. As soon as the portion 43 of the said arm is slightly elevated, the weight of the counterbalanced portion 44 overcomes the weight of the said arm portion 43, and the said arm swings laterally promptly. Thus the stub shaft 23 or 23' to which the said arm is attached, is rotated, which, in turn, transmits rotary movement, through the pinion 24 or 24' to the pinion 19 or 20, and the shaft 12 is rotated, which, through the sprocket wheels 11 and 17 and the chain 18, rotates the clutch member 5 in the opposite direction to that in which it rotates when the staff 33 is being elevated.

Having thus described my invention, what I claim as new, and desire to secure, by Letters Patent, is:—

1. In combination with a wheel-mounted frame, a marker staff pivotally attached thereto, arms located at the opposite sides of and adapted to engage the marker staff and means for operatively connecting the said arms with the supporting wheels of the frame.

2. In combination with a wheel-mounted frame a marker-staff pivotally mounted thereon, arms mounted at opposite sides of and adapted to engage the said marker staff, and means for operatively connecting the said arms alternately with the supporting wheels of the frame.

3. In combination with a wheel-mounted frame a marker-staff pivotally mounted thereon, a shaft transversely disposed with relation to the frame, means for operatively connecting the said shaft with the supporting wheels of the frame, beveled pinions carried by the shaft, stub shafts journaled for rotation at opposite sides of the said marker staff, beveled pinions carried by the stub shafts and having interrupted gears which mesh with the beveled pinions upon the first said shaft, arms carried by the stub shafts, and carrying means for engagement with the said staff.

4. In combination with a wheel-mounted frame, a marker-staff pivoted thereon, arms mounted at the opposite sides of the said staff, means for operatively connecting the said arms with the supporting wheels of the frame, and journaled spools carried by the said arms and adapted to engage the said staff.

5. In combination with a wheel-mounted frame, a marker-staff pivotally mounted thereon, arms mounted at the opposite sides of the said staff, means operatively connecting the said arms with the supporting wheels of the frame, spools journaled for rotation upon the arms and carrying at their forward ends annular flanges, said spools being adapted to engage the said staff.

6. In combination with a wheel mounted frame, a marker staff pivotally mounted thereon, arms located at the opposite sides of the marker staff, means for operatively connecting the said arms with the supporting wheels of the frame, spools journaled for rotation at the ends of the said arms and adapted to engage the staff, said spools having at their forward ends annular flanges; pins attached to the arms and serving as the axes of the said spools, and pear-shaped plates attached to said pins and having edge portions which project beyond the peripheries of the said spools.

7. In combination with a wheel-mounted frame, a staff pivotally mounted upon the frame, arms located at the opposite sides of and adapted to engage the said staff, means for operatively connecting the said arms with the supporting wheels of the frame, a frame mounted upon the forward portion of the first said frame and having an intermediate elevated portion and inclined side portions with inwardly disposed end portions attached to the first said frame, a tether member connected at one end portion slidably with the superimposed frame, and being connected, at its other end portion, with the outer portion of the said staff.

In testimony that I claim the foregoing as my own, I have hereto affixed my signature in the presence of two witnesses.

LEWIS McDANIEL.

Witnesses:
JAKE BARNES,
D. R. NELSON.